United States Patent
Mauerlechner et al.

(10) Patent No.: US 11,852,230 B2
(45) Date of Patent: Dec. 26, 2023

(54) GEAR WHEEL

(71) Applicant: IMS GEAR SE & CO. KGaA, Donaueschingen (DE)

(72) Inventors: Gregor Mauerlechner, Deisslingen (DE); Sebastian Schlude, Villingen-Schwenningen (DE); Markus Bernhard, Nenzingen (DE); Jonas Kuhn, Buchenbach (DE); Sebastian Birk, Trossingen (DE); Stephan Oberle, Villingen-Schwenningen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 0 days.

(21) Appl. No.: 17/010,006

(22) Filed: Sep. 2, 2020

(65) Prior Publication Data

US 2021/0062906 A1    Mar. 4, 2021

(30) Foreign Application Priority Data

Sep. 3, 2019 (EP) ..................... 19195055

(51) Int. Cl.
*F16H 55/12* (2006.01)
*F16H 55/17* (2006.01)
*F16H 55/06* (2006.01)

(52) U.S. Cl.
CPC ............. *F16H 55/17* (2013.01); *F16H 55/06* (2013.01); *F16H 55/12* (2013.01); *F16H 2055/065* (2013.01)

(58) Field of Classification Search
CPC .......... F16H 55/17; F16H 55/06; F16H 55/12; F16H 2055/065; F16H 55/14; F16H 55/16; F16H 2055/175; F16H 2055/185
See application file for complete search history.

(56) References Cited

U.S. PATENT DOCUMENTS

| 3,304,795 A * | 2/1967 | Rouverol | ............... F16H 55/06 74/411 |
| 2002/0029648 A1 * | 3/2002 | Noguchi | ............... F16H 55/17 74/461 |

(Continued)

FOREIGN PATENT DOCUMENTS

| DE | 102009000014 A1 | 7/2010 | |
| DE | 102012102777 A1 * | 10/2013 | ............. F16H 55/06 |

(Continued)

OTHER PUBLICATIONS

Extended European Search Report in corresponding EP application No. 19195055.9 dated Feb. 11, 2020.

(Continued)

*Primary Examiner* — Gregory Robert Weber
(74) *Attorney, Agent, or Firm* — Nath, Goldberg & Meyer; Jerald L. Meyer

(57) ABSTRACT

The present invention relates to a gear wheel comprising an outer part (12) having a gear rim (14), an insert (16) which has an insert outer diameter (dEa) and a receptacle section (32) having an insert part inner diameter (dEi) for forming a shaft-hub connection, and a connecting part (18) which is arranged between the insert part (16) and the outer part (12) and which connects the insert part (16) and the outer part (12) in a formfitting and/or materially-bonded and/or friction-locked manner, wherein the connecting part (18) has a number of ribs (27) or the connecting part (18) is formed by a number of ribs (27), wherein the ribs (27) each extend along a tangent (T) which abuts a tangent circle (CT), wherein the tangent circle (CT) has a tangent circle diameter (dCT) which is larger than or equal to the insert inner diameter (dEi) and smaller than or equal to the insert outer diameter (dEa).

21 Claims, 9 Drawing Sheets

(56) References Cited

U.S. PATENT DOCUMENTS

Figure 1A:
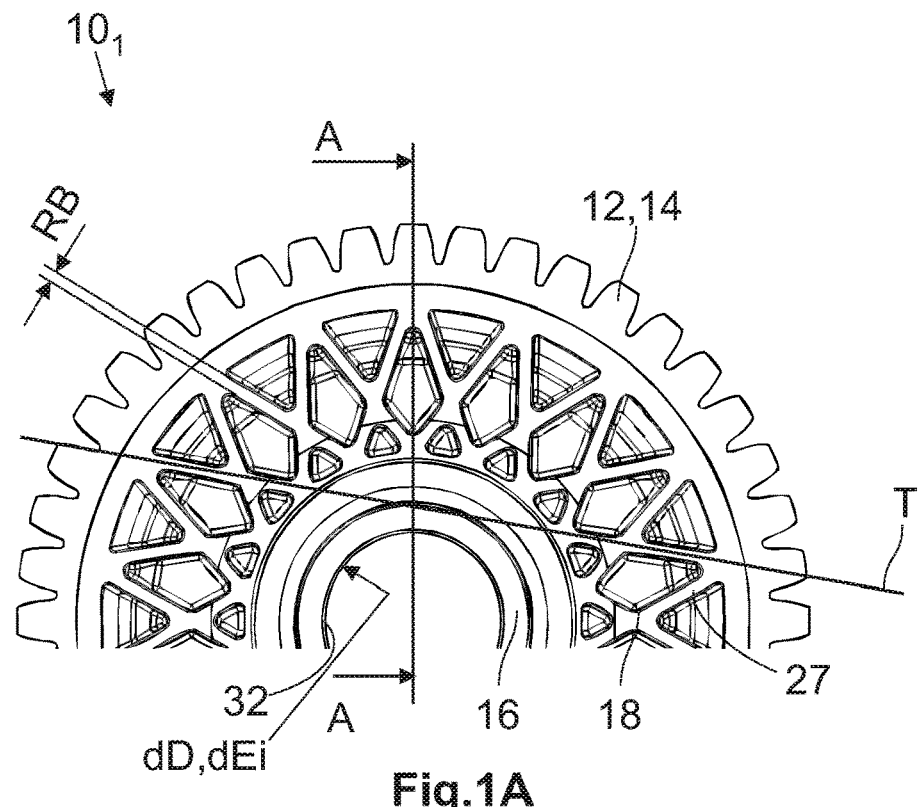

| | | | |
|---|---|---|---|
| 2005/0223831 A1* | 10/2005 | Oberle | F16H 55/14 |
| | | | 74/388 PS |
| 2006/0053918 A1* | 3/2006 | Asari | F16H 55/06 |
| | | | 74/423 |
| 2015/0047448 A1* | 2/2015 | Ta | F16H 55/17 |
| | | | 74/434 |
| 2017/0120487 A1* | 5/2017 | Brochot | B29C 45/14311 |
| 2018/0017149 A1* | 1/2018 | Takeuchi | F16H 55/22 |

FOREIGN PATENT DOCUMENTS

| | | |
|---|---|---|
| DE | 102004064237 B3 | 10/2014 |
| GB | 989898 A | 4/1965 |
| GB | 1005563 A | 9/1965 |
| JP | 2005-69296 A | 3/2005 |
| JP | 2013-130243 A | 7/2013 |
| KR | 10-2015-0088189 A | 7/2015 |
| WO | WO-2020126004 A1 * 6/2020 ............. F16H 55/14 |

OTHER PUBLICATIONS

Office Action dated Aug. 31, 2023, in Chinese application No. 202010906948.9 with English translation.

* cited by examiner

A-A

A-A

B-B

A-A

B-B

GEAR WHEEL

The present invention relates to a gear wheel.

Gear wheels play a central role in torque transmission and torque conversion in a drive train. While in the case of spur-toothed gear wheels, in many cases designed as so-called spur gears, the axial load on the spur gear is comparatively low, especially in the case of helical-toothed spur gears and worm or screw gears, high axial loads occur, as a result of which tilting moments are introduced into the gears. However, the axial loads must not lead to deformation of the gear wheel, as otherwise incorrect engagements with increased noise and increased wear will result. Although the deformations can be counteracted by increasing the width of the gear wheel, the associated increased use of material leads to an increase in weight and to an increase in the installation space required, which is usually not desirable. The increase in weight can be limited with a spoke design. In addition, gear wheels can be constructed from several materials in order to keep the weight low. Increasing the axial rigidity with the use of ribs is therefore known. As a result, the material is only used where it is needed to increase the axial rigidity. Known ribs of gear wheels have a parabolic base, also called a tree root base. With a rib design of this type, the shear force bending stress curve in the individual ribs is taken into consideration. The rib can become wider towards the center point of the gear wheel, which reduces both the torsional and also the axial deflection of the gear wheel when force is applied via the gear rim.

Further rib designs are disclosed in DE 10 2012 102 777 A1, DE 10 2014 003 441 A1, DE 10 2017 201 383 A1, and in EP 2 899 430 A1.

The gear wheels with meandering ribs disclosed in EP 2 899 430 A1 are distinguished by the fact that, especially with high axial forces, such as occur with helical gear teeth, only slight axial deformations occur. The increased axial rigidity is due in particular to the fact that wall portions, which are mainly arranged in the center of the gear wheels in conventional gear wheels, are shifted into the edge regions. In the event that gears having meandering ribs are injection molded, however, due to unfavorable flow paths, certain quality losses have to be accepted, in particular in the form of a reduced homogeneity of the plastic.

The rib design disclosed in DE 10 2017 201 383 A1 comprises ribs which have both convex and concave sections. However, the forces introduced into the ribs generate bending moments within the ribs, which is why the radial load capacity is limited.

An object of one embodiment of the present invention is to provide a gear wheel with which it is possible with simple and inexpensive means to provide a gear wheel which has a high axial rigidity and a high radial load capacity in a small installation space and is suitable for various manufacturing methods.

This object is achieved by the features specified in claim 1. Advantageous embodiments are the subject matter of the dependent claims.

One embodiment of the invention relates to a gear wheel comprising an insert which has an insert outer diameter and a receptacle section having a torque-transmitting diameter for forming a connection with an adjacent component, and a connecting part, connected in a formfitting and/or materially-bonded and/or friction-locked manner to the insert, having a gear rim, wherein the connecting part has a number of ribs or the connecting part is formed by a number of ribs, the ribs each extend along a tangent that abuts a tangent circle, the ribs have a rib thickness, and the tangent circle has a tangent circle diameter which is larger than or equal to the torque-transmitting diameter and smaller than or equal to a maximum diameter, which is defined as follows:

$$dA = dEa + 6\,RB$$

The gear wheel has an axis of rotation around which it is rotated during operation. The insert and the connecting part are arranged concentrically to the axis of rotation. The course of the ribs of the connecting part is determined according to the following specifications: starting from the tangent circle, which is likewise arranged concentrically to the axis of rotation and which is arranged on the insert part, a number is formed uniformly around the circumference of the tangent circle. The ribs extend along these tangents on the connecting part. Depending on the design of the gear wheel, the point of contact at which the tangents touch the tangent circle can be on the insert. In this case, the ribs cannot reach the point of contact. Therefore, two ribs separated from one another by the insert can extend on one tangent. However, it is just as possible to have only one rib extend on a tangent. Since tangents are straight lines by definition, the ribs also run straight and have no curvature in the plane in which the tangents extend. The rib thickness is to be understood as the maximum width of the ribs in a plane extending perpendicular to the axis of rotation.

If forces act on the teeth of the gear rim in the circumferential direction, the ribs are loaded by tension or pressure depending on the arrangement in relation to the point of application of the forces. The forces are introduced directly into the region of the insert, which results in high torsional rigidity.

According to a further embodiment, the receptacle section has an insert inner diameter for forming a shaft-hub connection with the adjacent component, which corresponds to the torque-transmitting diameter. In this exemplary embodiment, the adjacent component can in particular be a shaft that penetrates the gear wheel or projects into the gear wheel. The torque-transmitting diameter is the diameter at which the shaft is in contact with the insert. The adjacent component, here the shaft, adjoins the insert, which is sleeve-shaped in this exemplary embodiment, radially inward. The above-mentioned technical effects occur equally in this embodiment.

According to a further embodiment, the receptacle section has driving gear teeth for forming the shaft-hub connection, wherein the driving gear teeth has a driving gear teeth inner diameter that corresponds to the torque-transmitting diameter, and the tangent circle diameter is larger than or equal to the driving gear teeth inner diameter. In this embodiment, the forces introduced into the gear rim in the circumferential direction are introduced directly into the driving gear teeth, which results in a particularly favorable flow of force and high torsional rigidity.

In a refined embodiment, the insert outer diameter corresponds to the torque-transmitting diameter. In this embodiment, the torque transmission between the gear wheel and the adjacent component takes place axially offset in relation to the gear rim. In contrast to the shaft-hub connection described above, the adjacent component adjoins the insert part radially outward. The above-mentioned technical effects occur equally in this embodiment.

According to a refined embodiment, the receptacle section has running gear teeth for forming a running connection, wherein the running gear teeth have a running gear teeth inner diameter that corresponds to the torque-transmitting diameter, and the tangent circle diameter is larger than or equal to the running gear teeth inner diameter. In this embodiment as well, the torque transmission to an adjacent component takes place axially offset in relation to the gear rim, but in this case with running gear teeth, so that the adjacent component is itself a gear wheel. The above-mentioned technical effects occur equally in this embodiment.

In a refined embodiment, each two ribs in the connecting part outer diameter or in the region of the connecting part outer diameter can be connected to one another. As mentioned, some ribs are subjected to tension and other ribs to pressure when forces are introduced into the gear room in the circumferential direction. Because the ribs, which are subjected to pressure and tension, are connected to one another in the connecting part outer diameter or in the region of the connecting part outer diameter, this results in a particularly favorable flow of force and high torsional rigidity.

According to a refined embodiment, the course of the ribs is selected so that at least two ribs intersect. In particular, if the ribs are connected to one another in the connecting part outer diameter or in the region of the connecting part outer diameter and at least two ribs intersect, the ribs form a diamond-shaped framework. Where the two ribs intersect, nodes are formed, which also have a favorable effect on the force curve and the torsional rigidity.

In a further embodiment, the connecting part can form a first end face and a second end face, wherein the connecting part has at least one depression which starts from one of the two end faces and forms a depression base, wherein the ribs extend starting from the depression base toward the end face or beyond the end face from which the depression starts. In principle, the connecting part can be designed to be spoke-shaped in the manner of a bicycle wheel, so that the ribs essentially form the only connection between the insert and the outer part. In the case of a spoke-shaped design, the connecting part is not closed in the axial direction along the axis of rotation. In this embodiment, the connecting part is closed, since the depression base extends between the insert and the connecting part without interruption. The ribs start from the depression base. The uninterrupted, closed design of the connecting part also contributes to a uniform flow of force and to increased torsional rigidity.

A refined embodiment is distinguished in that the connecting part has at least one first depression at least one second depression, wherein the first depression starts from the first end face and the second depression starts from the second end face. In this embodiment, at least one depression starts from each end face of the connecting part. The depression base is thus displaced toward the axial center of the connecting part, so that the connecting part can have a high degree of symmetry. The torsional rigidity is then independent or largely independent of the direction of loading.

According to a further embodiment, the first depressions are arranged offset radially and/or in the circumferential direction in relation to an axis of rotation of the gear wheel. The depressions are arranged more evenly distributed, whereby material accumulations may be avoided, which has a favorable effect on the material homogeneity when the gear wheel is produced in a casting method. The bending rigidity may also be increased.

A further embodiment is distinguished in that the first depressions are located between the second depressions. Overlap regions are avoided in this way, in which two depressions are directly adjacent viewed along the axis of rotation and in relation to a radius. This measure also increases the torsional rigidity.

A further embodiment is distinguished in that the gear wheel has a width and the first depressions starting from the first end face and the second depression starting from the second end face extend over more than half the width. This results in a meandering course in relation to a plane of section in which the axis of rotation lies. A material concentration results on the end faces, whereby the axial and torsional rigidities are increased.

According to a further embodiment, a number of first ribs are arranged in the first depression and a number of second ribs are arranged in the second depression, which are arranged offset in relation to one another in the circumferential direction. In this way, material accumulations may be avoided, which has a favorable effect on the material homogeneity when the gear wheel is produced in a casting method.

In a further embodiment, the insert is made of metal. The use of metal enables the transmission of high torques on small diameters, so that an insert having a comparatively small diameter can be used. This also saves installation space.

In a further embodiment, the connecting part can be made of a plastic. The use of plastic enables the connection part to be manufactured using the injection molding method, as a result of which high piece counts can be manufactured at low cost. With the proposed rib design, a uniform flow behavior of the plastic in the injection molds is achieved, so that voids or similar inhomogeneities can be avoided.

According to a refined embodiment, the gear rim is formed by an outer part which is connected to the connecting part in a formfitting and/or materially-bonded and/or friction-locked manner. The outer part can be produced from a different material than the connecting part. The material can thus be selected for the special loads in the gear rim, while the material of the connecting part can be selected for the special loads in the connecting part. Overall, a gear wheel optimally adapted for the loads having an extended service life results.

In a refined embodiment, the connecting part can have a doughnut-shaped inner connecting section adjoining the insert radially outward, to which the ribs are connected radially inward, and a circular outer connecting section adjoining the outer part radially inward, to which the ribs are connected radially outward. It is possible that the ribs are connected directly to the insert and/or the outer part, so that the connecting part is designed to be spoke-shaped. However, a comprehensive connection between the connecting part and the insert and between the connecting part and outer part is provided by the circular connecting sections and the contact surface with the outer part and/or the insert is enlarged. Furthermore, the ribs are stiffened by the doughnut-shaped connecting section. As a result, the force curve is evened out and the torsional rigidity is increased. Peak stresses are avoided in particular.

In a further embodiment, the outer part is made of a first plastic and the connecting part is made of a second plastic. The first plastic is a high-performance thermoplastic or a technical thermoplastic and/or the second plastic is a high-performance thermoplastic, a technical thermoplastic, or a thermoset. The outer part having the gear rim is subject to high wear and/or high forces, which can be countered particularly effectively using high-performance thermoplastics, without the high-performance thermoplastics having to be fiber-reinforced. The semi-crystalline high-performance thermoplastics from the family of polyaryl ether ketones (PAEK) such as PEK (polyether ketone), PEEK (polyether ether ketone), or PEKK (polyether ketone ketone) are particularly suitable as high-performance thermoplastics. PPS (polyphenylene sulfide) or PPA (polyphthalamide) are also suitable. The second plastic can also be a high-performance thermoplastic, so that embodiments are also conceivable in which the connecting part and the outer part are made of the same plastic. In this case, however, it makes sense to make the second plastic from which the connecting part is made fiber-reinforced in order to increase the axial rigidity. The use of fiber-reinforced plastics for the outer part having the gear rim is disadvantageous in that it would result in increased wear on the gear rim and fiber abrasion or fiber breakage can occur. In particular, if the second plastic of the connecting part is fiber-reinforced, less high-quality and therefore cheaper plastics such as technical thermoplastics, for example semi-crystalline thermoplastics such as PET (polyethylene terephthalate), PA (polyamide), or POM (polyoxymethylene), can also be used. Thermosets such as polyester can also be used. PA (polyamide) or POM (polyoxymethylene), which are technical thermoplastics, can also be used for the outer part.

If the insert is made of metal and the connecting part and the outer part are made of plastic, there is a so-called multicomponent gear wheel. Every part is subjected to different loads. A particular advantage of these multi-component gear wheels is that the material suitable for the corresponding loads can be selected for each part of the multi-component gear wheel. Different embodiments of multi-component gear wheels are disclosed in DE 101 27 224 A1 and EP 1 777 439 B1.

Figure 2A:
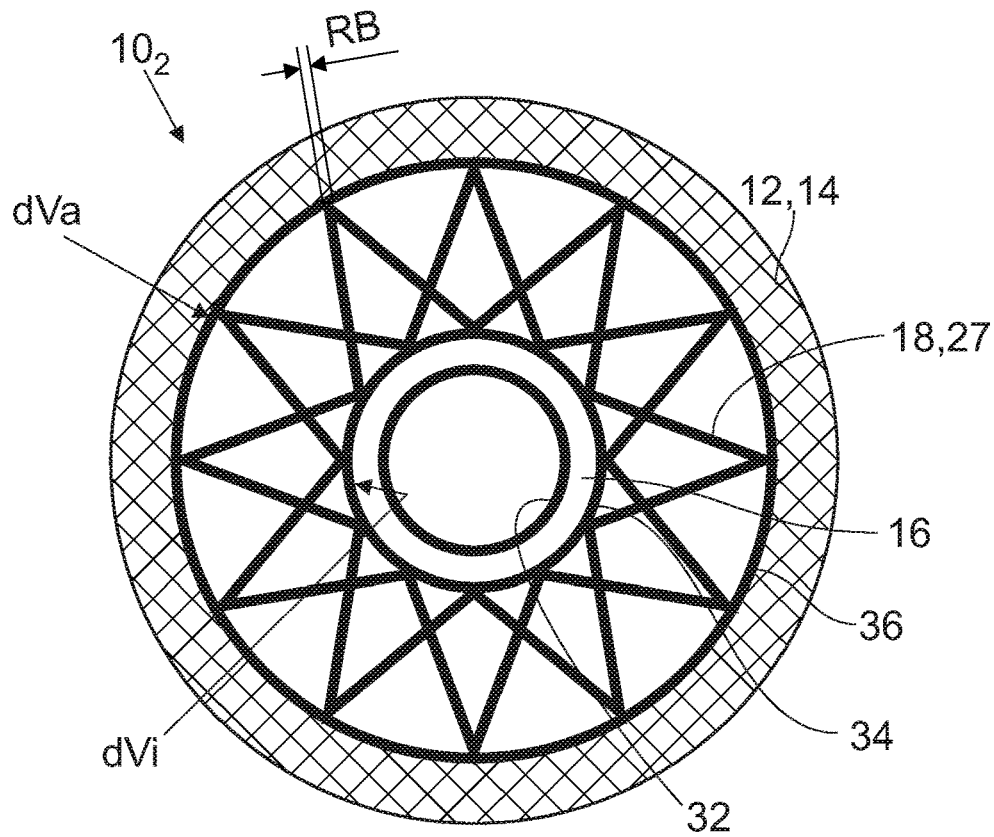
Figure 2B:
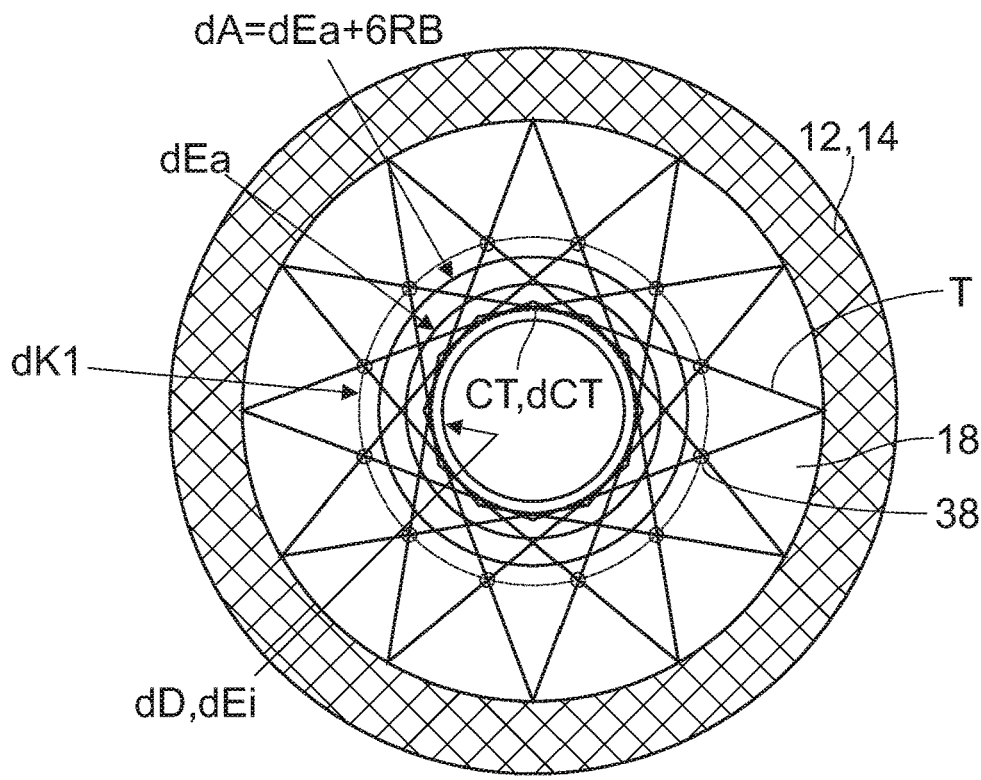
Figure 3A:
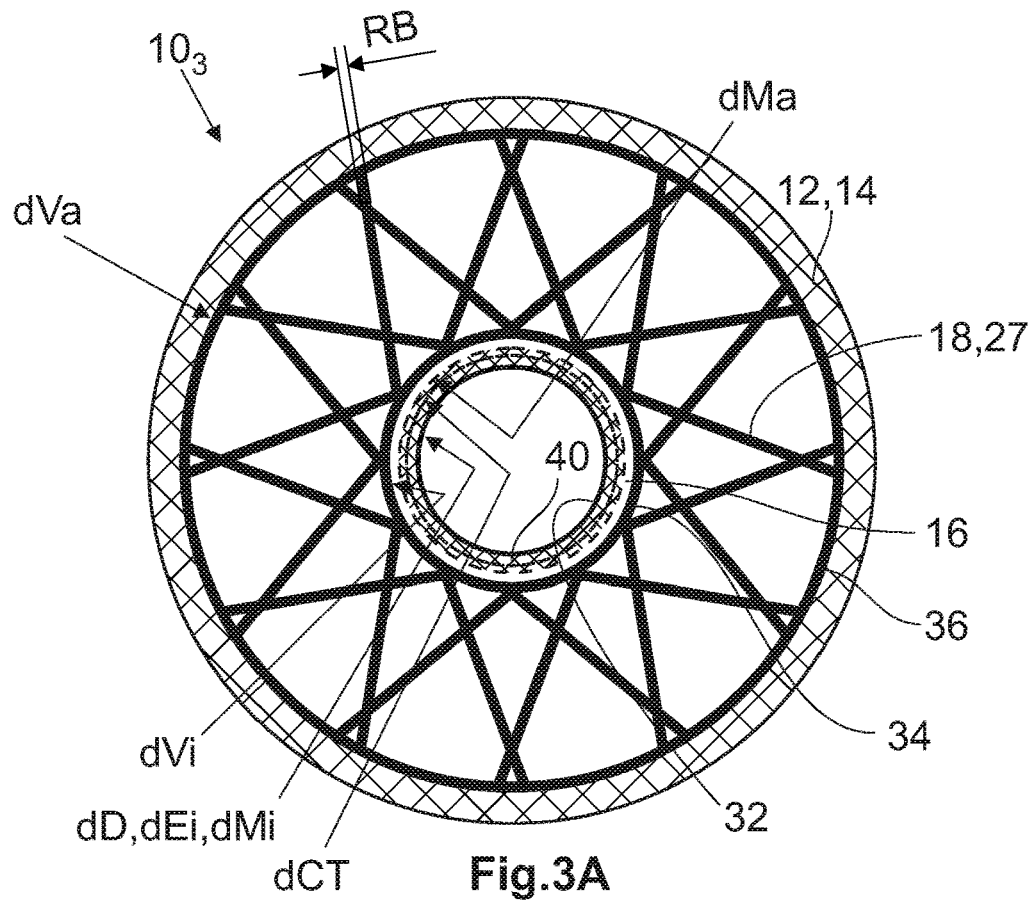
Figure 3B:
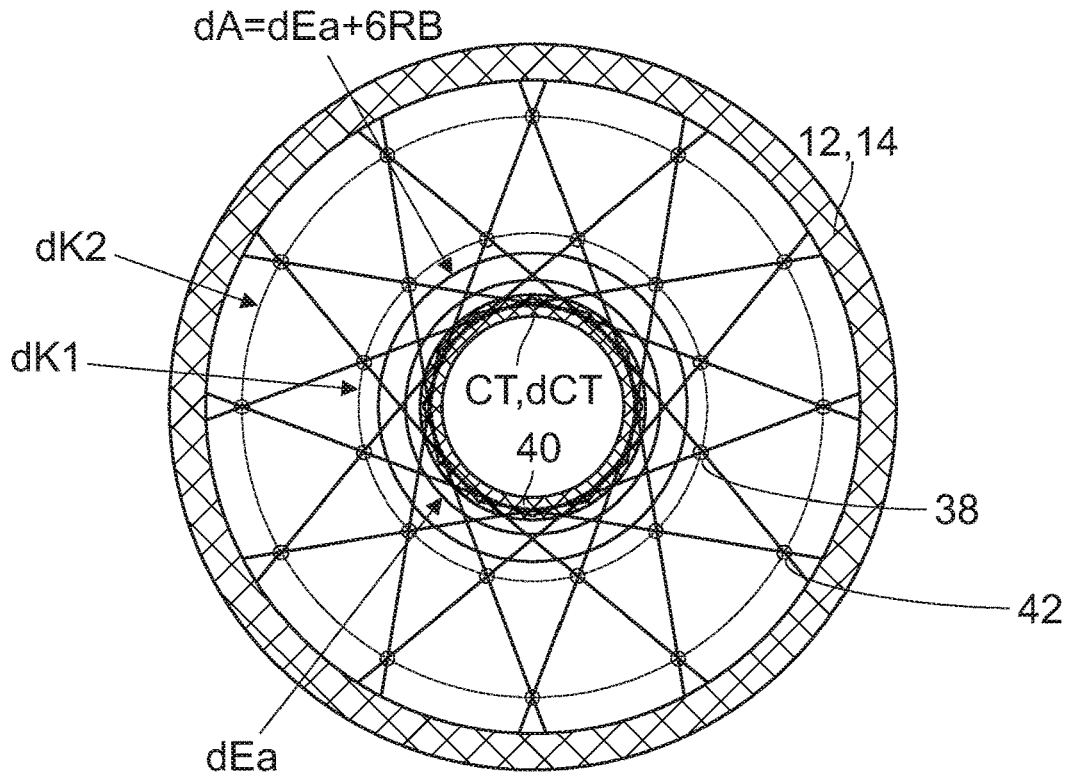
Figure 4A:
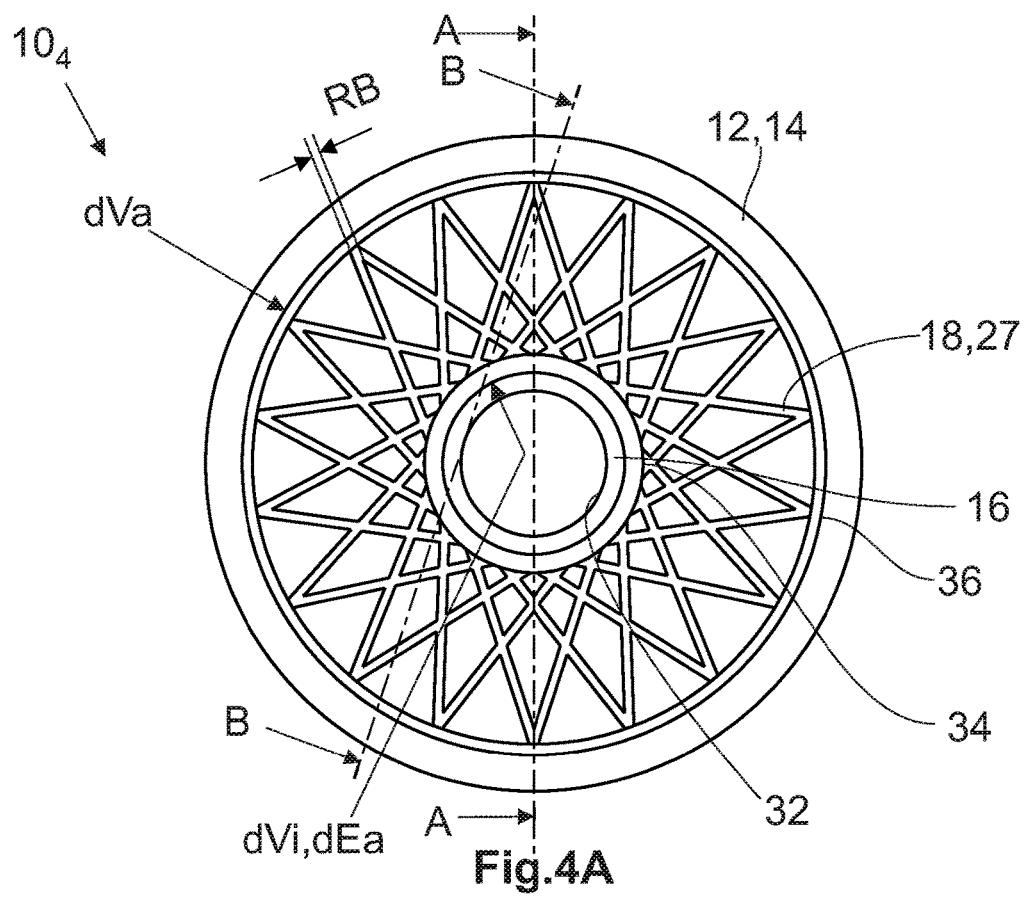
Figure 4B:
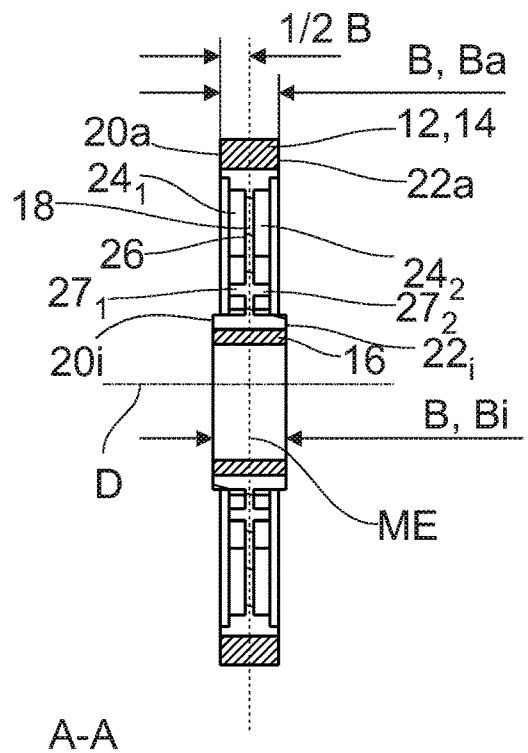
Figure 4C:
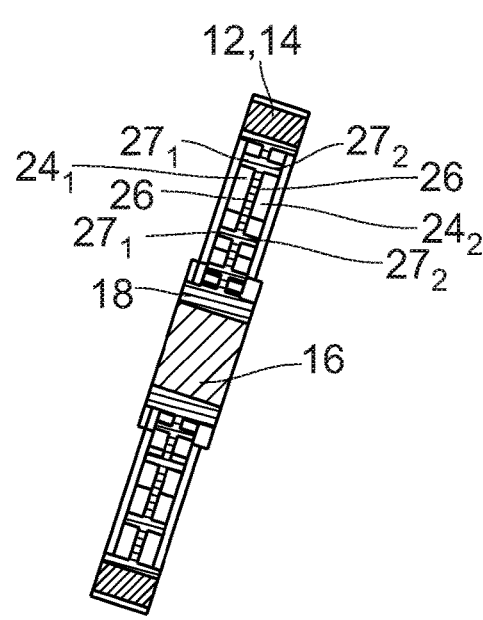
Figure 5A:
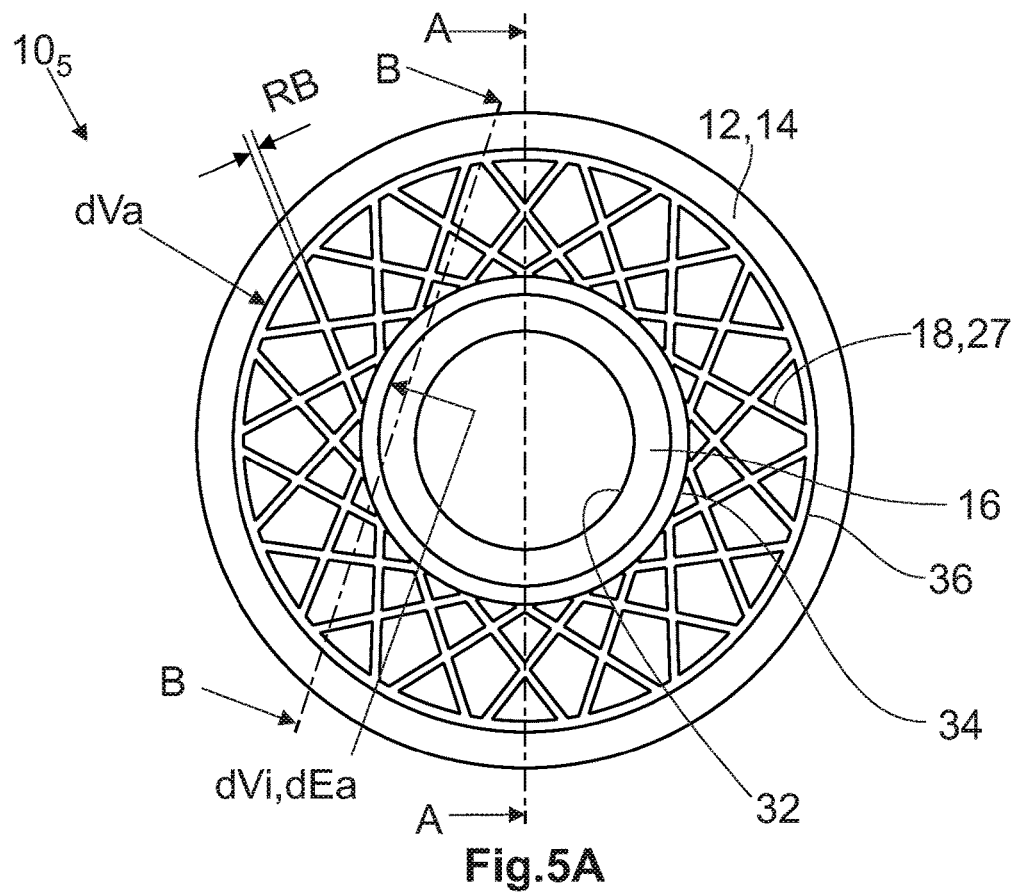
Figure 5B:
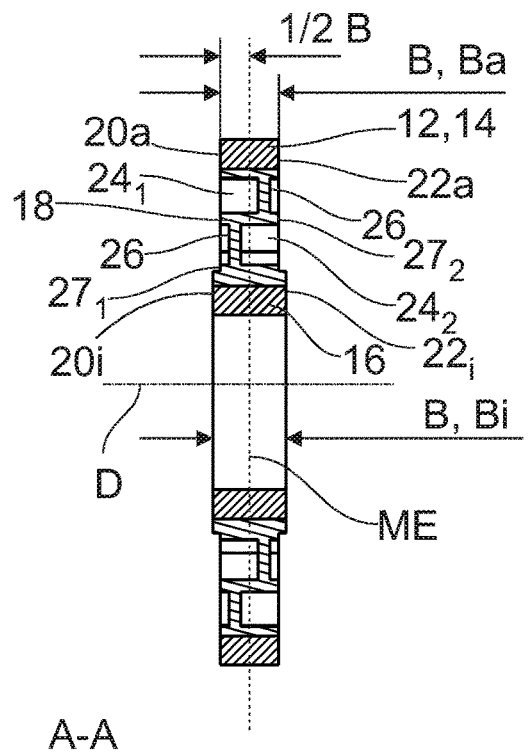
Figure 5C:
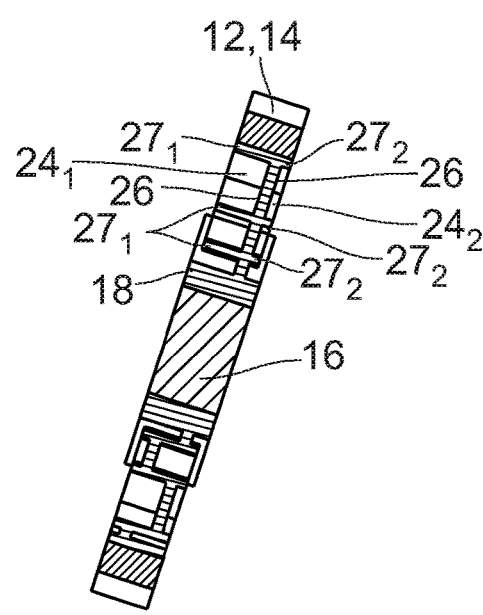
Figure 6:
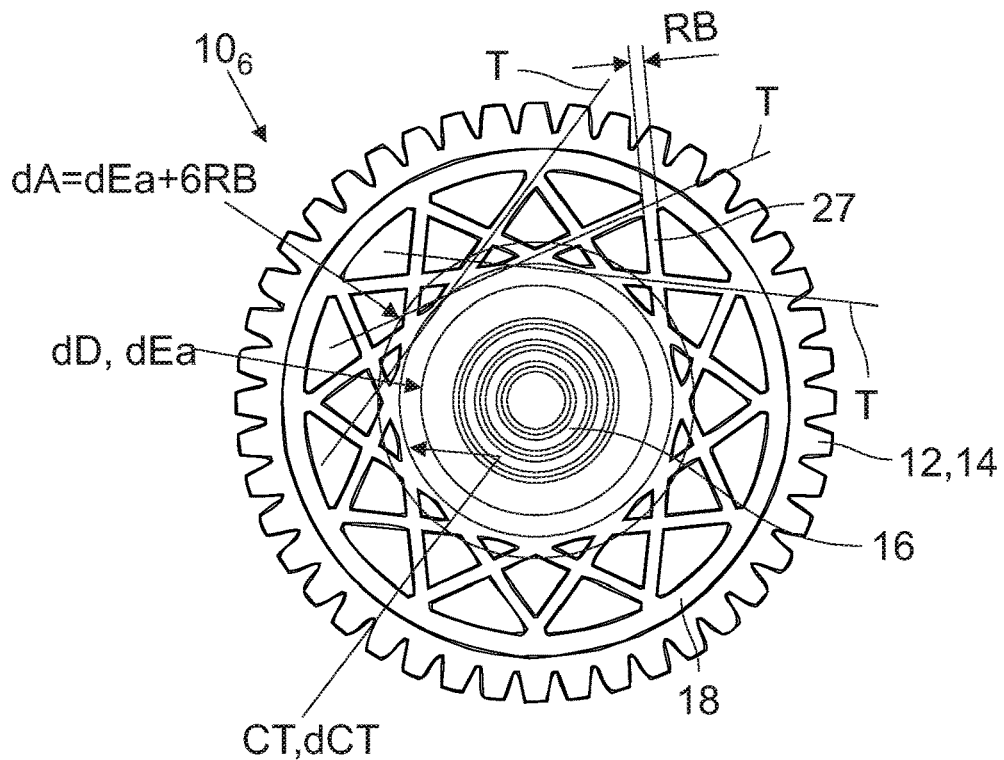
Figure 7:
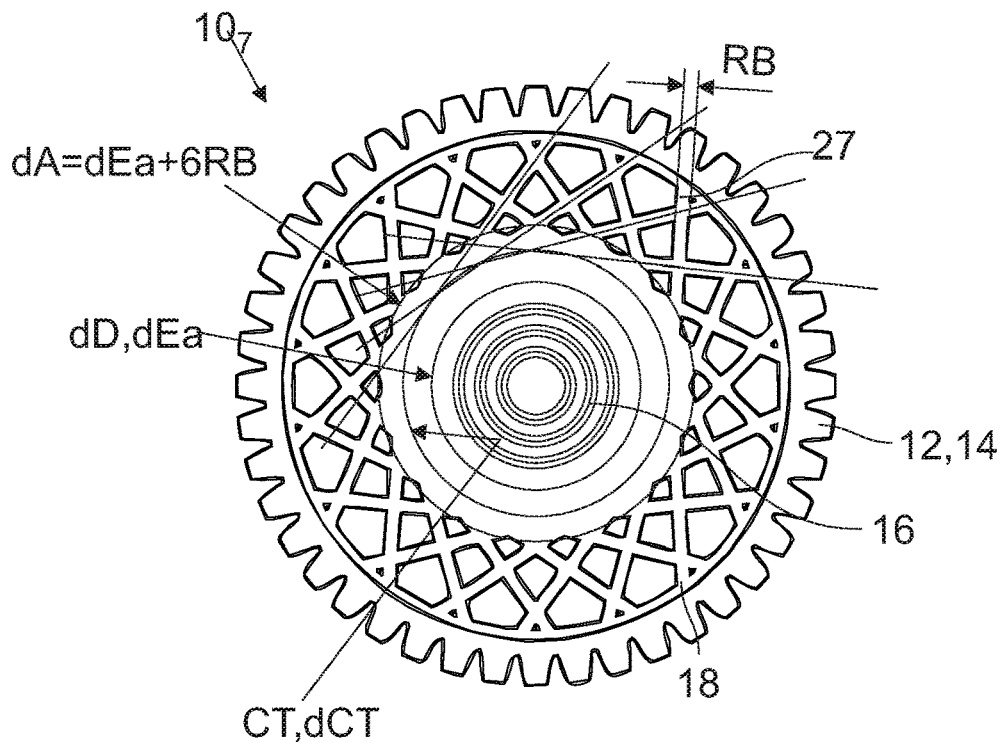
Figure 8A:
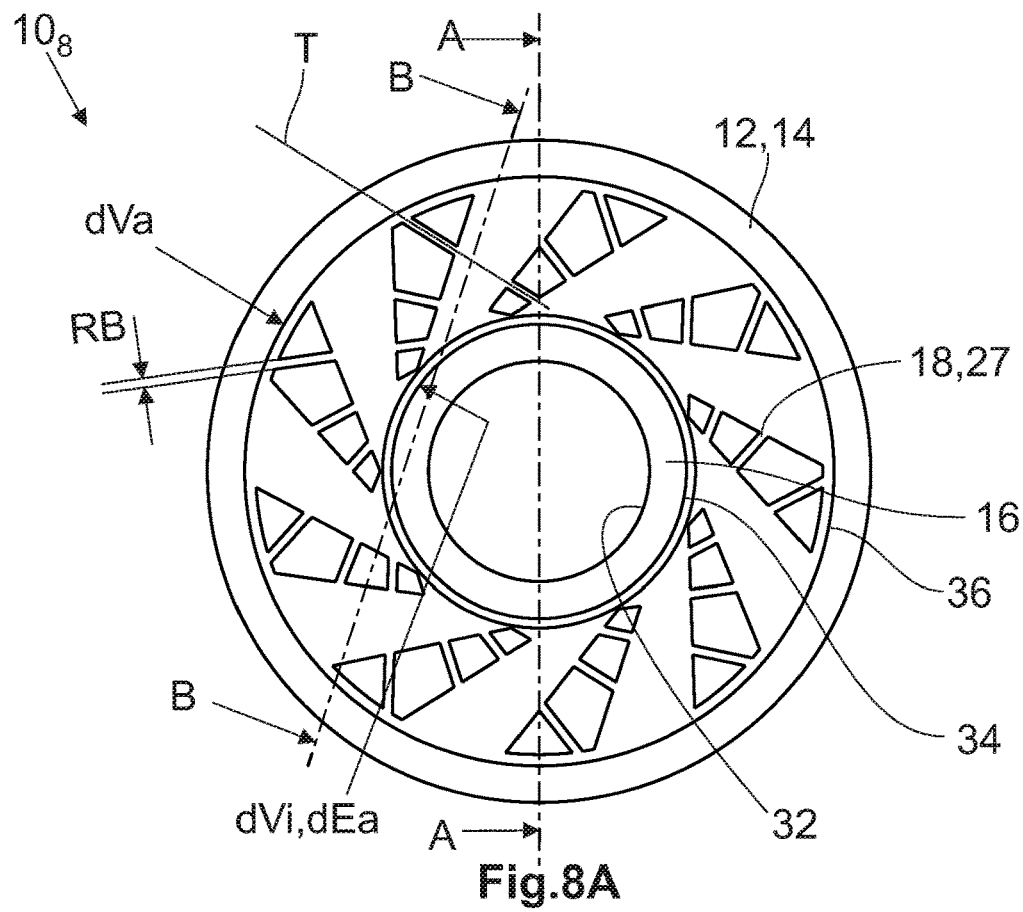
Figures 8B, 8C:
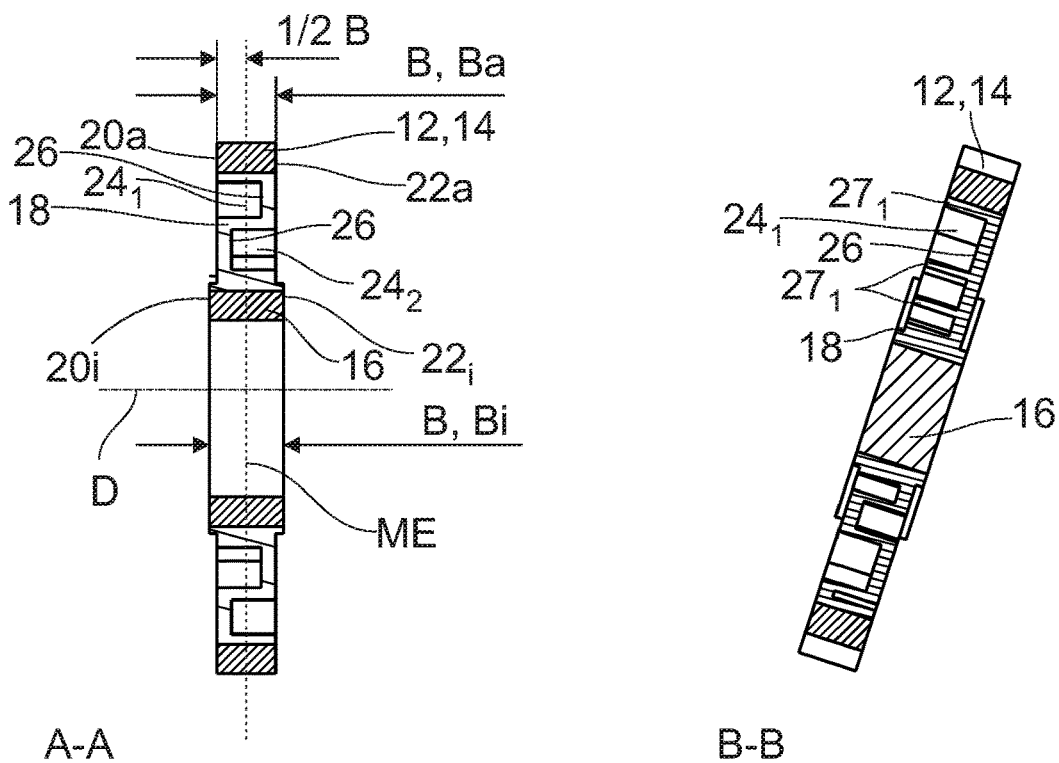
Figure 9:
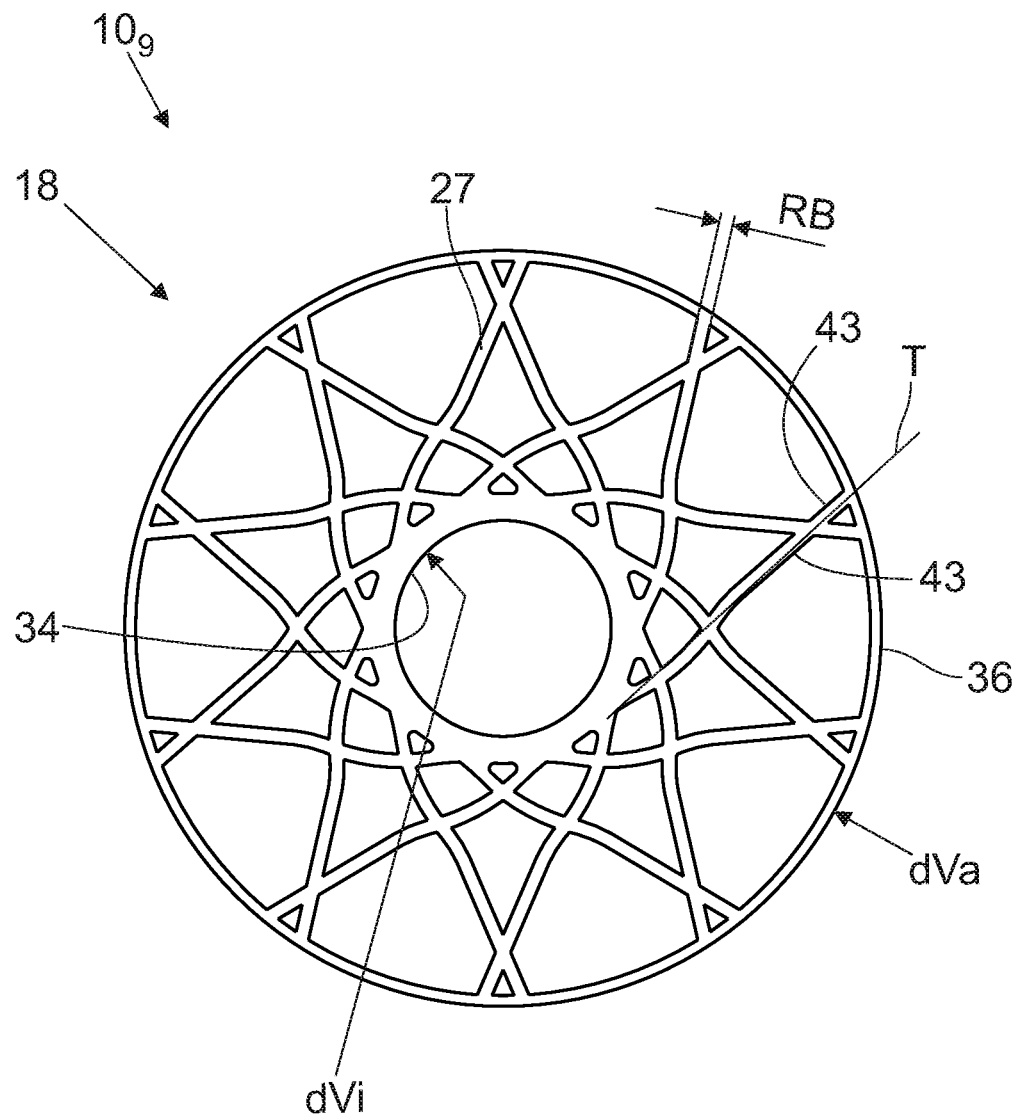
Figure 10:
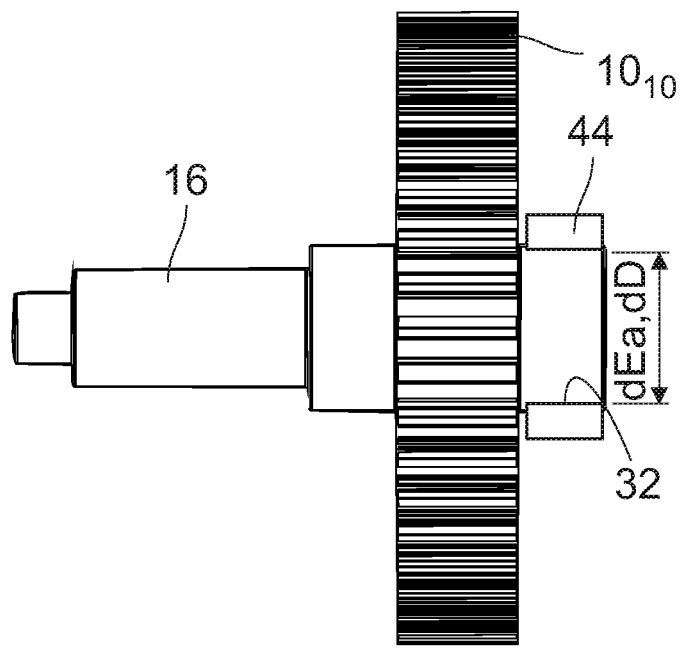
Figure 11:
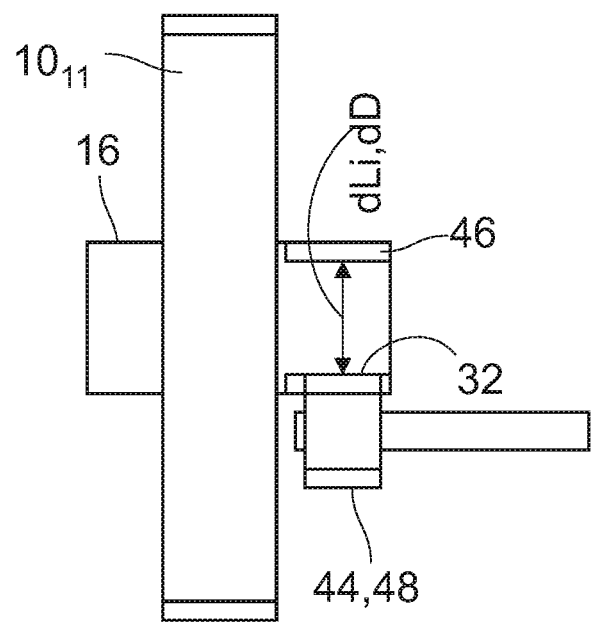

Exemplary embodiments of the invention are explained in more detail hereafter with reference to the appended drawings. In the figures FIG. 1A shows a side view of a first exemplary embodiment of a gear wheel according to the invention, FIG. 1B shows a sectional illustration of the first exemplary embodiment of the gear wheel along the plane of section A-A defined in FIG. 1A, FIG. 2A shows a schematic sectional illustration of a second exemplary embodiment of the gear wheel according to the invention FIG. 2B shows a schematic illustration related to FIG. 2A to explain the principle according to the invention, FIG. 3A shows a schematic sectional illustration of a third exemplary embodiment of the gear wheel according to the invention FIG. 3B shows a schematic illustration related to FIG. 3A to explain the principle according to the invention, FIG. 4A shows a side view of a fourth exemplary embodiment of the gear wheel according to the invention, FIG. 4B shows a sectional illustration through the fourth exemplary embodiment of the gear wheel according to the invention along the plane of section A-A defined in FIG. 4A, FIG. 4C shows a sectional illustration through the fourth exemplary embodiment of the gear wheel according to the invention along the plane of section B-B defined in FIG. 4A, FIG. 5A shows a side view of a fifth exemplary embodiment of the gear wheel according to the invention, FIG. 5B shows a sectional illustration through the fifth exemplary embodiment of the gear wheel according to the invention along the plane of section A-A defined in FIG. 5A, FIG. 5C shows a sectional illustration through the fifth exemplary embodiment of the gear wheel according to the invention along the plane of section B-B defined in FIG. 5A, FIG. 6 shows a side view of a sixth exemplary embodiment of the gear wheel according to the invention, FIG. 7 shows a side view of a seventh exemplary embodiment of the gear wheel according to the invention, FIG. 8A shows a side view of an eighth exemplary embodiment of the gear wheel according to the invention, FIG. 8B shows a sectional illustration through the eighth exemplary embodiment of the gear wheel according to the invention along the plane of section A-A defined in FIG. 8A, FIG. 8C shows a sectional illustration through the eighth exemplary embodiment of the gear wheel according to the invention along the plane of section B-B defined in FIG. 8A, FIG. 9 shows a side view of a ninth exemplary embodiment of the gear wheel according to the invention, wherein only the connecting part is shown, FIG. 10 shows a top view of a ninth exemplary embodiment of the gear wheel according to the invention in the installed state, and FIG. 11 shows a top view of a tenth exemplary embodiment of the gear wheel according to the invention in the installed state.

Figure 1B:
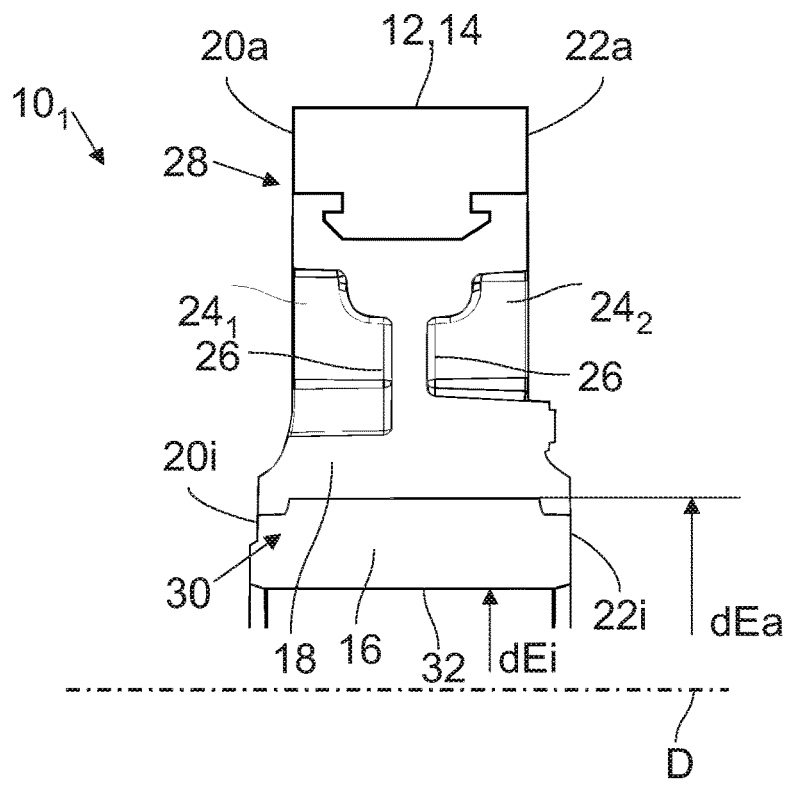

FIGS. 1A and 1B illustrate a gear wheel 101 according to the invention according to a first embodiment. The gear wheel 101 has an outer part 12 having a gear rim 14, an insert 16, and a connecting part 18 arranged between the insert 16 and the outer part 12. Not shown is an exemplary embodiment in which the gear rim 14 is formed by the connecting part 18 and the gear wheel 10 does not have a separate outer part 12. The insert 16, the connecting part 18, and the outer part 12 are arranged concentrically to an axis of rotation D of the gear wheel 101. In the first exemplary embodiment, the insert 16 is made of metal, while the outer part 12 is made of a first plastic and the connecting part 18 is made of a second plastic. The outer part 12 having the gear rim 14 is subject to high wear, which can be countered particularly effectively using high-performance thermoplastics, without the high-performance thermoplastics having to be fiber-reinforced. The semi-crystalline high-performance thermoplastics from the family of polyaryl ether ketones (PAEK) such as PEK (polyether ketone), PEEK (polyether ether ketone), or PEKK (polyether ketone ketone) are particularly suitable as high-performance thermoplastics. PPS (polyphenylene sulfide) or PPA (polyphthalamide) are also suitable. The outer part 12 can also be produced from PA (polyamide) or POM (polyoxymethylene), which are technical thermoplastics. The second plastic can also be a high-performance thermoplastic, so that embodiments are also conceivable in which the connecting part 18 and the outer part 12 are made of the same plastic. In this case, however, it makes sense to make the second plastic from which the connecting part 18 is manufactured fiber-reinforced in order to increase the axial rigidity. In particular, if the second plastic of the connecting part 18 is fiber-reinforced, less high-quality and therefore cheaper plastics such as technical thermoplastics, for example semi-crystalline thermoplastics such as PET (polyethylene terephthalate), PA (polyamide), or POM (polyoxymethylene), can also be used. Thermosets such as polyester can also be used. Depending on the plastic used, the parts in question can be produced in the injection molding method.

As can be seen in particular from FIG. 1B, which shows the gear wheel shown in FIG. 1A cut along the plane of section A-A defined in FIG. 1, the connecting part 18 forms a radially outer first end face 20a, a radially inner first end face 20i, a radially outer second end face 22a, and a radially inner second end face 22i starting from the axis of rotation D. Viewed axially along the axis of rotation D, the radially inner first end face 20i projects beyond the radially outer first end face 20a. Correspondingly, the radially inner second end face 22i projects beyond the radially outer second end face 22a.

Starting from the first end faces 20a, 20i, the connecting part 18 has a first depression 241 and, starting from the second end faces 22a, 22i, a second depression 242, each having a continuous depression base 26. The connecting part 18 is consequently completely closed and has no openings extending along the axis of rotation D. It is apparent from FIG. 1A that the connecting part 18 is equipped with a number of ribs 27 which, starting from the recess bases 26, extend toward the respective end faces 20, 22 from which the recess 241, 242 in question starts. The ribs have a rib thickness RB, which will be discussed in more detail later. The rib thickness RB describes the maximum width of the ribs in a plane extending perpendicular to the axis of rotation D.

It can be clearly seen from FIG. 1B that the connecting part 18 has first undercuts 28 in the radial direction, which produce a formfitting connection to the outer part 12. Furthermore, the connecting part 18 has second undercuts 30 in the axial direction, with which the connecting part 18 is connected to the insert 16 in a form-fitting manner. In order to prevent the connecting part 18 from slipping in the circumferential direction in relation to the outer part 12 and the insert, the connecting part 18 is connected in a formfitting manner to the outer part 12 and is also connected in a formfitting manner to the insert 16. The insert 16 has a receptacle section 32 and, in the first exemplary embodiment, is designed in the form of a sleeve, so that an adjacent component 44 (not shown here) (cf. FIGS. 8 and 9), for example a shaft extending concentrically to the axis of rotation D, can thus be connected to the insert 16 so that a torque can be transmitted between the gear wheel 101 and the adjacent component 44. In this exemplary embodiment, the insert 16 surrounds the adjacent component 44. The insert 16 comes into contact with the adjacent component at a diameter dD, which is referred to hereinafter as torque-transmitting. In the first exemplary embodiment, the torque-transmitting diameter dD corresponds to an insert inner diameter dEi. In addition, the insert 16 has an insert outer diameter dEa at which the insert is in contact with the connecting part 18. The importance of the insert outer diameter dEa is discussed in detail below. As can be seen from FIG. 1B, the insert outer diameter dEa decreases step-by-step toward the inner first end face 20i and toward the inner second end face 22i. In the following, in the case that the insert has multiple insert outer diameters dEa, the relevant insert outer diameter dEa is to be the largest insert outer diameter dEa.

FIG. 2A shows a second exemplary embodiment of the gear wheel $10_2$ according to the invention on the basis of a schematic sectional illustration, the plane of section extending perpendicular to the axis of rotation D (see FIG. 1B). To explain the course of the ribs 27, the necessary auxiliary curves and auxiliary lines are shown in FIG. 2B.

The ribs 27 extend along tangents T that abut a tangent circle CT. Consequently, in the second exemplary embodiment, the ribs 27 are straight and have no curvature or bulges in a plane perpendicular to the axis of rotation D. At this point, reference is already made to the exemplary embodiment of the gear wheel 109 according to the invention shown in FIG. 9, in which the ribs have curvatures or bulges. The tangent circle CT has a tangent circle diameter dCT, which lies on the insert 16 in the second exemplary embodiment of the gear wheel 102 according to the invention. It follows from this that the tangent circle diameter dCT is greater than or equal to the insert inner diameter dEi and less than or equal to a maximum diameter dA, which is defined as follows:

$$dA=dEa+6\ RB$$

In other words, the tangents extend in such a way that the tangent circle CT formed by them has a tangent circle diameter dCT which lies in an annular region, the lower limit of which corresponds to the torque-transmitting diameter dD, which in this case coincides with the insert inner diameter dEi, and the upper limit of which is limited by the maximum diameter dA, which larger than the insert outer diameter dEA by six times the rib thickness RB. In the exemplary embodiment shown, the tangent circle diameter dCT is smaller than the insert outer diameter dEa. Expressed in summary in mathematical terms:

$$dD=dEi\leq dCT\leq dA=dEa+6\ RB$$

The maximum diameter dA is preferably defined as follows:

$$dA=dEa+4\ RB$$

Due to the fact that in the second exemplary embodiment of the gear wheel $10_2$ according to the invention the ribs 27 are arranged on the connecting part 18, but the tangent circle CT is arranged on the insert 16, the ribs 27 cannot touch the tangent circle CT. Therefore, two ribs 27 separated from one another by the insert 16 can extend on the same tangent T. In the exemplary embodiment shown in FIG. 2A, only one rib 27 extends on a tangent T, while in the example shown in FIG. 1A, two ribs 27 separated by the insert 16 extend on a tangent T. A tangent T is shown as an example in FIG. 1A.

In addition, the connecting part 18 has a doughnut-shaped inner connecting section 34 adjoining the insert 16 radially outward, to which the ribs 27 are connected radially inward, and a circular outer connecting section 36 adjoining the outer part 12 radially inward, to which the ribs 27 are connected radially outward.

As can be seen from FIGS. 1A and 2A, two ribs 27 meet in the region of an outer diameter dVa of the connecting part 18. In addition, the number of tangents T is selected such that two ribs 27 intersect. The first nodes 38 thus resulting lie on a first intersection diameter dK1, which, viewed radially outward, is at approximately one-fourth of the distance between an inner diameter dVi and the outer diameter dVa of the connecting part 18. Different designs are conceivable.

FIG. 3A shows a third exemplary embodiment of the gear wheel 103 according to the invention on the basis of a schematic sectional illustration, wherein the plane of the section extends perpendicular to the axis of rotation D (see FIG. 1B). To explain the course of the ribs 27, the necessary auxiliary curves and auxiliary lines are shown in FIG. 3B.

The gear wheel 103 according to the third exemplary embodiment largely resembles the gear wheel $10_2$ according to the second exemplary embodiment, but a rib 27 not only intersects with one further rib 27, but with two further ribs 27, so that second nodes 42 result, which lie on a second intersection diameter dK2. The second intersection diameter dK2 is larger than the first intersection diameter dK1 and, viewed radially outward, is approximately seven-eighths of the distance between the inner diameter dVi and the outer diameter dVa of the connecting part 18.

The insert 16 of the gear wheel 103 according to the third exemplary embodiment has driving gear teeth 40 having a driving gear teeth inner diameter dMi and a driving gear teeth outer diameter dMa. The driving gear teeth inner diameter dMi corresponds to the torque-transmitting diameter dD and the insert inner diameter dEi. In this case, the tangent circle diameter dCT is larger than or equal to the driving gear teeth inner diameter dMi and smaller than or equal to the driving gear teeth outer diameter dMa, wherein the relationship given above is maintained, according to which:

$$dD \leq dCT \leq dA = dEa + 6RB$$

FIGS. 4A to 4C show a fourth exemplary embodiment of the gear wheel $10_4$ according to the invention on the basis of various illustrations. FIG. 4A is a side view of the gear wheel $10_4$ according to the fourth exemplary embodiment, while FIG. 4B is a sectional illustration along the plane of section A-A defined in FIG. 4A and FIG. 4B is a sectional illustration along the plane of section B-B defined in FIG. 4A. It can be seen that the gear wheel $10_4$ according to the fourth exemplary embodiment also has the radially outer first end face 20a and the radially inner first end face 20i, the radially outer second end face 22a, and the radially inner second end face 22i. The radially outer first end face 20a and the radially inner first end face 20i are axially offset with respect to one another as seen along the axis of rotation D and are not aligned. The radially outer second end face 22a and the radially inner second end face 22i are also not axially aligned with respect to the axis of rotation D. The gear wheel $10_4$ therefore has an inner width Bi and an outer width Ba, which are not equal. In the illustrated exemplary embodiment, the outer width Ba is less than the inner width Bi.

The first depression $24_1$ starts from the radially outer first end face 20a and from the radially inner first end face 20i. Correspondingly, the second depression $24_2$ starts from the radially outer second end face 22a and from the radially inner second end face 22i. It can be clearly seen that the ribs 27 start from the depression base 26 and extend in the direction of those end faces 20, 22 from which the depressions 24 in question originate. The connecting part 18 is constructed symmetrically with respect to a central plane ME extending perpendicular to the axis of rotation D.

FIGS. 5A to 5C show a fifth exemplary embodiment of the gear wheel $10_5$ according to the invention on the basis of various illustrations. FIG. 5A is a side view of the gear wheel $10_5$ according to the fifth exemplary embodiment, while FIG. 5B is a sectional illustration along the plane of section A-A defined in FIG. 5A and FIG. 5B is a sectional illustration along the plane of section B-B defined in FIG. 5A. In this exemplary embodiment, the first depression $24_1$ is arranged radially offset in relation to the second depression $24_2$. Furthermore, the first depression $24_1$ starting from the outer first end face 20a and the second depression $24_2$ starting from the outer second end face 22a extend over more than half of the outer width Ba of the gear wheel $10_1$. In relation to the planes of section selected for FIG. 5, the connecting part 18 has an S-shaped or meandering course and is not constructed symmetrically with respect to a central plane ME extending perpendicular to the axis of rotation D.

FIGS. 6 and 7 show a sixth exemplary embodiment and a seventh exemplary embodiment, respectively, of a proposed gear wheel $10_6$, $10_7$ on the basis of a side view. The gear wheels $10_6$, $10_7$ according to the sixth exemplary embodiment and the seventh exemplary embodiment differ from the other gear wheels $10_1$ to $10_5$, inter alia, in the number of ribs 27 and in the angles which the ribs 27 enclose with one another. In addition, the insert 16 in this case is not designed in the form of a sleeve, but as a solid shaft, so that here no insert inner diameter dEi can be defined or it is zero (see also FIG. 8). The solid shaft is to have a constant insert outer diameter dEa, so that this corresponds to the torque-transmitting diameter in the sixth exemplary embodiment of the proposed gear wheel $10_6$. This applies accordingly to the sixth exemplary embodiment of the proposed gear wheel $10_7$.

FIGS. 8A to 8C show an eighth exemplary embodiment of the gear wheel $10_8$ according to the invention on the basis of various illustrations. FIG. 8A is a side view of the gear wheel $10_8$ according to the eighth exemplary embodiment, while FIG. 8B is a sectional illustration along the plane of section A-A defined in FIG. 8A and FIG. 8B is a sectional illustration along the plane of section B-B defined in FIG. 8A. While in the previously described embodiments the ribs 27 are arranged symmetrically to a mirror plane extending through the axis of rotation D, in other words a first group of ribs extends to the left starting from the outer part 12 and a second group to the right, the ribs 27 in the eighth exemplary embodiment of the gear wheel $10_8$ according to the invention form only one group. Starting from the outer part 12, they only extend to the left in relation to the illustration selected in FIG. 8A. As can be seen in particular from FIGS. 8B and 8C, the connecting part 18 has an S-shaped or meandering course and is not constructed symmetrically with respect to a central plane ME extending perpendicular to the axis of rotation D, as is also the case in the fifth embodiment of the gear wheel $10_5$ according to the invention shown in FIGS. 5A to 5C.

FIG. 9 shows a connecting part 18 of a ninth exemplary embodiment of the gear wheel $10_9$ according to the invention on the basis of a side view. The outer part 12 (not shown here) and the insert part 16 (also not shown) can be constructed exactly as shown for the previously explained exemplary embodiments. The essential difference of the ninth exemplary embodiment of the gear wheel $10_9$ according to the invention compared to the other exemplary embodiments of the gear wheel $10_1$ to $10_8$ is in the course of the ribs 27. While the ribs 27 in the other exemplary embodiments of the gear wheel $10_1$ to $10_8$ extend straight, i.e., do not have curvatures or bulges, the ribs 27 in the ninth exemplary embodiment of the gear wheel $10_9$ have curvatures or bulges. The curvatures or bulges are designed in such a way that the ribs 27 never extend outside the tangents T of the tangent circle CT having the tangent circle diameter dCT defined at the outset, wherein the side walls 43 of the ribs 27 can touch the tangent T in sections.

FIG. 10 shows a tenth exemplary embodiment of the gear wheel $10_{10}$ according to the invention on the basis of a top view. It can be seen that the insert 16 completely penetrates the gear wheel $10_{10}$. With respect to the illustration selected in FIG. 10, an adjacent component 44 on the right side is connected to the insert part 16. The adjacent component 44 surrounds the insert 16 in the receptacle section 32 and comes into contact with the receptacle section 32 of the insert 16 at the insert outer diameter dEa. In this case, the insert outer diameter dEa corresponds to the torque-transmitting diameter dD.

A ninth exemplary embodiment of the gear wheel $10_{11}$ according to the invention is shown in FIG. 11 on the basis of a schematic illustration. The insert 16 is also designed as a solid shaft in this exemplary embodiment, which has running gear teeth 46 in the receptacle section 32. With this running gear teeth 46, the adjacent component 44 meshes with the adjacent component 44, which in this case is designed as a gear wheel 48. The running gear teeth 46 have the running gear teeth inner diameter dLi, which in this case corresponds to the torque-transmitting diameter dD.

The above-mentioned relationship also applies to the gears $10_6$ to $10_{11}$ according to the sixth to eleventh exemplary embodiments, according to which the tangent circle diameter dCT lies in an annular region, the lower limit of which is limited by the torque-transmitting diameter dD and the upper limit of which is limited by the maximum diameter dA, which is greater than the insert outer diameter dEA by six times the rib thickness RB.

$$dD \leq dCT \leq dA = dEa + 6RB$$

LIST OF REFERENCE SIGNS 10 gear wheel
$10_1$ to $10_5$ gear wheel according to various exemplary embodiments
12 outer part
14 gear rim
16 insert
18 connecting part
20 first end face
20a outer first end face
20i inner first end face
22 second end face
22a outer second end face
22i inner first end face
24 depression
$24_1$ first depression
$24_2$ second depression
26 depression base
27 ribs
28 first undercuts
30 second undercuts
32 receptacle section
34 inner connecting section
36 outer connecting section
38 first nodes
40 driving gear teeth
42 second nodes
43 side walls of ribs
44 adjacent component
46 running gear teeth
B width
Ba outer width
Bi inner width
CT tangent circle
dA maximum diameter
dCT tangent circle diameter
dD torque-transmitting diameter
dEa insert outer diameter
dEi insert inner diameter
dK1 first intersection diameter
dK2 second intersection diameter
DMa driving gear teeth outer diameter
DMi driving gear teeth inner diameter
dVa outer diameter of connecting part
dVi inner diameter of connecting part
ME center plane
T tangent

The invention claimed is:

1. A gear wheel, comprising:
an insert (16) which has an insert outer diameter (dEa) and a receptacle section (32) having a torque-transmitting diameter (dD) for forming a connection to an adjacent component (44); and
a connecting part (18), connected in a formfitting or materially-bonded or friction-locked manner to the insert (16), having a gear rim (14),
wherein the connecting part (18) comprises a number of ribs (27),
wherein each of the ribs (27) extends along a tangent line (T), such that each of the tangent lines (T) of the plurality of ribs (27) is tangent to a common tangent circle (CT), and
wherein each of the ribs (27) is straight,
wherein each of the ribs (27) has a rib thickness (RB), and
wherein the tangent circle (CT) has a tangent circle diameter (dCT), which is larger than or equal to the torque-transmitting diameter (dD) and is smaller than or equal to a maximum diameter (dA), which is defined as follows:

$$dA = dEa + 6 \; RB.$$

2. The gear wheel as claimed in claim 1, characterized in that the receptacle section (32) has an insert inner diameter (dEi) for forming a shaft-hub connection with the adjacent component (44), which corresponds to the torque-transmitting diameter (dD).

3. The gear wheel as claimed in claim 2, characterized in that the receptacle section (32) has driving gear teeth (40) for forming the shaft-hub connection, wherein the driving gear teeth (40) have a driving gear teeth inner diameter (DMi) that corresponds to the torque-transmitting diameter (dD), and the tangent circle diameter (dCT) is larger than or equal to the driving gear teeth inner diameter (DMi).

4. The gear wheel as claimed in claim 1, characterized in that the insert outer diameter (dEa) corresponds to the torque-transmitting diameter (dD).

5. The gear wheel as claimed in claim 4, characterized in that the receptacle section (32) has running gear teeth (46) for forming a running connection, wherein the running gear teeth (40) have a running gear teeth inner diameter (DLi) that corresponds to the torque-transmitting diameter (dD), and the tangent circle diameter (dCT) is larger than or equal to the running gear teeth inner diameter (DLi).

6. The gear wheel as claimed in claim 1, characterized in that the number of ribs (27) comprises pairs of ribs (27), wherein the ribs (27) of each of the pairs of ribs (27) are connected to one another in the connecting part outer diameter (dVa) or in the region of the connecting part outer diameter (dVa).

7. The gear wheel as claimed in claim 1, characterized in that a course of the number of ribs (27) is selected such that at least two of the ribs (27) of the number of ribs (27) intersect, wherein the course of the number of ribs (27) comprises directions along which the number of ribs (27) extend within the gear wheel.

8. The gear wheel as claimed in claim 1, characterized in that the connecting part (18) has a cylindrical ring-shaped inner connecting section (34) which adjoins the insert part (16) radially outward and to which the ribs (27) are connected radially inward.

9. The gear wheel as claimed in claim 1, characterized in that the connecting part (18) forms a first end face (20) and a second end face (22), wherein the connecting part (18) has at least one depression (24), which starts from one of the two end faces (20, 22) and forms a depression base (26), wherein the ribs (27) extend starting from the depression base (26) toward the respective end face (20) or beyond the respective end face (20, 22) from which the depression (24) starts.

10. The gear wheel as claimed in claim 9, characterized in that the connecting part (18) has at least one first depression (241) and at least one second depression (242), wherein the first depression (241) starts from the first end face (20) and the second depression (242) starts from the second end face (22).

11. The gear wheel as claimed in claim 10, characterized in that the first depressions (241) and/or the second depressions (242) are arranged offset radially and/or in the circumferential direction in relation to an axis of rotation of the gear wheel (10).

12. The gear wheel as claimed in claim 11, characterized in that the first depressions (241) lie between the second depressions (242).

13. The gear wheel as claimed in claim 12, characterized in that the gear wheel (10) has a width (B) and the first depressions (241) starting from the first end face (20) and the second depressions (242) starting from the second end face (22) extend over more than half the width (B).

14. The gear wheel as claimed in claim 10, characterized in that a number of first ribs (271) are arranged in the first depression (241) and a number of second ribs (272) are arranged in the second depression (242), which are arranged offset in relation to one another in the circumferential direction.

15. The gear wheel as claimed in claim 1, characterized in that the insert (16) is made of metal.

16. The gear wheel as claimed in claim 1, characterized in that the connecting part (18) is made of a plastic.

17. The gear wheel as claimed in claim 16, characterized in that the outer part (12) is made of a first plastic and the connecting part (18) is made of a second plastic and the first plastic is a high-performance thermoplastic or a technical thermoplastic and/or the second plastic is a high-performance thermoplastic, a technical thermoplastic, or a thermoset.

18. The gear wheel as claimed in claim 1, characterized in that the gear rim (14) is formed by an outer part (12), which is connected to the connecting part (18) in a formfitting or materially-bonded or friction-locked manner.

19. The gear wheel as claimed in claim 1, characterized in that the connecting part has a circular outer connecting section (36) which adjoins the outer part (12) and is positioned inwardly with respect to the outer part (12) in a radial direction, and wherein each of the ribs (27) has an inward end and an outward end in the radial direction, the outward ends of the number of ribs (27) connecting to the circular outer connecting section (36).

20. The gear wheel as claimed in claim 1, wherein the connecting part (18) consists of the number of ribs (27).

21. The gear wheel as claimed in claim 1, wherein an entirety of each of the ribs (27) extends along a corresponding one of the tangent lines (T).

* * * * *